US008433601B2

(12) United States Patent
Ohsaki

(10) Patent No.: US 8,433,601 B2
(45) Date of Patent: Apr. 30, 2013

(54) WORKFLOW SYSTEM, INFORMATION PROCESSOR, AND METHOD AND PROGRAM FOR WORKFLOW MANAGEMENT

(75) Inventor: Hiroyasu Ohsaki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 11/743,406

(22) Filed: May 2, 2007

(65) Prior Publication Data

US 2007/0208603 A1     Sep. 6, 2007

Related U.S. Application Data

(63) Continuation of application No. 10/167,743, filed on Jun. 10, 2002, now Pat. No. 7,349,864.

(30) Foreign Application Priority Data

Jun. 28, 2001    (JP) .................................. 2001-195798

(51) Int. Cl.
     *G06Q 10/10*    (2006.01)
(52) U.S. Cl.
     USPC ......................................................... 705/7.27
(58) Field of Classification Search .............. 705/8, 7.27
     See application file for complete search history.

(56) References Cited

U.S. PATENT DOCUMENTS

| 5,745,687 A | * | 4/1998 | Randell ........................ 709/201 |
| 5,806,059 A |   | 9/1998 | Tsuchida et al. |
| 5,878,398 A | * | 3/1999 | Tokuda et al. .................. 705/8 |
| 5,918,226 A |   | 6/1999 | Tarumi et al. |
| 5,937,388 A |   | 8/1999 | Davis et al. |
| 6,041,306 A | * | 3/2000 | Du et al. ........................ 705/8 |
| 6,151,583 A |   | 11/2000 | Ohmura et al. |
| 6,341,291 B1 | * | 1/2002 | Bentley et al. .............. 707/203 |
| 6,401,073 B1 |   | 6/2002 | Tokuda et al. |

(Continued)

FOREIGN PATENT DOCUMENTS

| JP | 08329151 | 12/1996 |
| JP | 10-063751 | 3/1998 |

(Continued)

OTHER PUBLICATIONS

F. Leymann and W. Altenhuber, "Managing Business Processes as an Information Resource", Dec. 1994, IBM Systems Journal, vol. 33, No. 2, pp. 327-348.

(Continued)

*Primary Examiner* — Romain Jeanty
(74) *Attorney, Agent, or Firm* — John L. Rogitz

(57) ABSTRACT

A workflow system is provided in which one person in charge efficiently processes each activity assigned to successive nodes. When a client request management program execution unit 330 of a workflow server 30 receives a request to terminate processing for a node from a user's computer terminal for operation 20, a definition for the node is referred to by a project management program execution unit 310. If processing of a process management program execution unit 320 is completed within a consecutive processing standby time $t_1$ defined for the node, and it is determined that a next node can be processed by the user, a client request management program execution unit 330 requests a computer terminal for operation 20 to start processing of a next node.

7 Claims, 11 Drawing Sheets

DATA DEFINITION

U.S. PATENT DOCUMENTS

| | | | |
|---|---|---|---|
| 6,859,823 B1 * | 2/2005 | Nishihara et al. | 707/203 |
| 6,957,186 B1 | 10/2005 | Guheen et al. | |
| 6,985,938 B2 | 1/2006 | Ohsaki et al. | |
| 7,024,669 B1 * | 4/2006 | Leymann et al. | 718/100 |
| 7,240,324 B2 * | 7/2007 | Casati et al. | 717/103 |
| 7,349,864 B2 | 3/2008 | Ohsaki | |

FOREIGN PATENT DOCUMENTS

| | | |
|---|---|---|
| JP | 11-219401 | 8/1999 |
| JP | 2000-029959 | 1/2000 |
| JP | 2000-222508 | 8/2000 |

OTHER PUBLICATIONS

D. Wodtke and G. Weikum, "A Formal Foundation for Distribution Workflow Execution Based on State Charts", 2001, Department of Computer Science, p. 231-246.

\* cited by examiner

WORKFLOW DEFINITION

DATA DEFINITION

| DEFINITION ID | PRIORITY | ACTIVITY | AVAILABLE User ID | DATA DEFINITION | ... | NEXT ACTIVITY | CONSECUTIVE PROCESSING STANDBY TIME |
|---|---|---|---|---|---|---|---|
| DEFINITION α | 1 | NodeA | PERSON IN CHARGE A | ... | ... | NodeB NodeC | 3Sec |
| | 2 | NodeB | PERSON IN CHARGE A OR PERSON IN CHARGE B | ... | ... | NONE | 0Sec |
| | 3 | NodeC | PERSON IN CHARGE C | ... | ... | Node OF DEFINITION.... | 7Sec |

Figure 5

| DEFINITION ID | PROCESS ID | ACTIVITY | EXECUTING USER | DATA |
|---|---|---|---|---|
| DEFINITION a | d001 | NodeA | PERSON IN CHARGE | Name = <br> Subject = <br> Depts[ ] = |

Figure 11

WORKFLOW SYSTEM, INFORMATION PROCESSOR, AND METHOD AND PROGRAM FOR WORKFLOW MANAGEMENT

This is a continuation of and claims priority from U.S. patent application Ser. No. 10/167,743 filed Jun. 10, 2002 now U.S. Pat. No. 7,349,864.

FIELD OF THE INVENTION

The present invention relates to improvement in an office workflow, and particularly to, for example, a workflow system that can improve processing efficiency.

BACKGROUND OF THE INVENTION

In order to streamline office clerical work, or due to space cost for file cabinets or environmental considerations etc., there has long been a need to computerize slip processing to build a paperless document processing system. Thus, computerized workflow systems have been developed. A "workflow" refers to a series of flows of predetermined tasks stereotyped according to the contents of work. Management of such a workflow has recently been achieved as a feature of groupware.

An example of workflow systems will be specifically described with reference to an example of application processing. FIG. 13 is a diagram showing a flow of application processing. FIG. 14 is a diagram showing a conventional screen on a processing person's computer in application processing shown in FIG. 13. In application processing shown in FIG. 13, "Reception Process", "Process 1", and "Process 2" are carried out after a submission of an application, and "Process 1" and "Process 2" are described here as separate activities. This means that once "Reception Process" has completed, "Process 1" and "Process 2" may be performed by different persons in parallel.

First, when an application is submitted as shown in FIG. 13, Processing Person A performs "Reception Process" such as verifying entries. Specifically, a list of work items as shown in FIG. 14 (*a*1) is displayed to Processing Person A, who selects an activity to process from that list. Then, a screen shown in FIG. 14 (*a*2) is displayed to the processing person A, who will proceed to "Reception Process".

When "Reception Process" is completed by Processing Person A, next "Process 1" and "Process 2" are allowed to be processed. Since Processing Person B performs "Process 1", a list of work items as shown in FIG. 14(*b*1) is displayed to Processing Person B. Processing Person B then selects an activity to process from that list as described above. A process screen as shown in FIG. 14 (*b*2) is displayed to Processing Person B, who will then proceed to "Process 1". In the same manner, Processing Person C performs "Process 2".

In such a workflow system in which a plurality of activities are processed in series, a "list of work items" is displayed to a processing person. Once a processing person has selected a predetermined activity and the activity has been completed, a next activity for the start of which is prerequisite completion of a predetermined activity becomes available for processing. Then the next activity that has become available for processing is added to a "list of work items" that will be displayed to a person able to process a next activity. Accordingly, the person available for processing selects a next activity and starts processing thereof.

PROBLEMS TO BE SOLVED BY THE INVENTION

In application processing shown in FIG. 13, "Process 1" may be processed by the same person as a person having processed "Reception Process", i.e., Processing Person B who will perform "Process 1" can be the same person as Processing Person A who performed "Reception Process". In this case, even if Processing Person A is going to proceed to perform "Process 1" immediately after completion of "Reception Process", a list of work items shown in FIG. 14 (*b*1) will be displayed to Processing Person A after completion of "Reception Process". Thus, Processing Person A need to look for a corresponding activity through the list shown in FIG. 14 (*b*1) and to select it again, which takes much time and effort.

It is also possible for both of "Reception Process" and "Process 1" to be defined and processed as a single activity in order to relieve Processing Person A from the burden of selecting a corresponding activity from a list shown in FIG. 14 (*b*1) in the processing of "Process 1". Then, "Process 2" that could have been processed by Processing Person C in parallel with "Process 1" should be started after completion of "Process 1", which decreases total throughput. Moreover, in order to make such setting possible that each activity may be processed by either one person or more persons, applications for sequencing processes, for sending and receiving data, and for screen transition must be developed for each processing person. This could be laborious, or these applications may be too complicated to be developed.

In addition, in application processing shown in FIG. 13, processing both "Process 1" and "Process 2" by one person may result in higher productivity. For example, "Process 1" and "Process 2" may be set to be processed by one person for usual occasions, and once a person originally set to process both of the processes has become overloaded, "Process 1" and "Process 2" may be set to be processed by different persons. In such a case, in order that one person may perform "Process 1" and "Process 2" consecutively, a list of work items should be displayed after completion of "Process 1", and a corresponding activity should be selected again by the person as in the above-described case. It is also difficult to eliminate these inconveniences as in the above-described case.

As such, in a workflow system consisting of a plurality of activities, when a plurality of activities that can be processed by one or more persons were processed by different persons as required, efficient processing was difficult to be achieved.

The present invention is accomplished to solve such technical challenges and it is principal object of the intention to provide a workflow system that achieves efficient processing.

SUMMARY OF THE INVENTION

To achieve the object, the invention determines whether consecutive processing of tasks by one person in a workflow system is possible or not. Therefore, the present invention provides a workflow system for a plurality of users to execute a task according to a predetermined workflow on a plurality of computer terminals connected to a network, including storage means of storing each workflow definition defining a plurality of contents and a flow of tasks and information about a user who can process a task; and determination means of determining whether a user in charge having processed a predetermined task is able to process a next task or not for the start of which is prerequisite completion of processing of a predetermined task based on user information stored in storage means. By determining whether it is possible for one user to process a series of tasks or not, a flow of tasks can be efficiently determined.

In particular, if the determination means determines that a user in charge can process a next task, the system further includes request management means of requesting the user in charge to process a next task so that the user in charge can process a predetermined task and a next task consecutively.

In addition, storage means stores a consecutive processing standby time for tasks, and after the predetermined task processing has been completed by the user in charge, the request management means determines that the user in charge can process a next task in the consecutive processing standby time for the predetermined tasks, the request management means requests the user in charge to process the next task thereby preventing the user in charge from waiting for longer period than a predetermined standby time.

In another aspect, the present invention may be understood as a workflow system connecting over a network a workflow server for managing a workflow using a workflow definition consisting of a plurality of nodes and a path connecting the nodes and a computer terminal for operation to execute an activity assigned to the nodes, wherein the computer terminal for operation sends a request to terminate processing for corresponding nodes to the workflow server in response to completion of an activity, and if the node being requested to terminate processing and the next node defined in the workflow definition can be processed by one person in charge, the workflow server makes a request to process the next node to the computer terminal for operation of the person in charge.

In this case, a workflow definition can define a group of a plurality of users as the persons in charge who can process the node, thereby dynamically assigning a person in charge to a node.

In addition, after receiving a request to terminate processing, if the workflow server is ready to make the person in charge start processing the next node in a predetermined consecutive processing standby time, the workflow server preferably makes a request to process the next node.

In this workflow system, a workflow definition may be designed by means of a computer terminal for designing connected over a network, and may be sent to the workflow server.

In another aspect, the present invention may be understood as an information processor connected to a plurality of computer terminals for executing a workflow over a network. This information processor is characterized in that it can manage a workflow definition consisting of a plurality of nodes and paths connecting the nodes and a data definition referred to in the workflow definition as a project by project management means; manage a process that is a task unit of the workflow using a project managed by the project management means by process management means; and manage a user accessing the computer terminal based on the process managed by the process management means by user management means, and after a predetermined node has been processed by a computer terminal, the process management means determines whether a next node connected to the predetermined node by the path can be processed successively by the computer terminal or not, and outputs a determination thereof to the user management means.

The information processor can indicate appropriate processing to a computer terminal by determining whether consecutive processing is possible or not for a computer terminal connected over a network.

Specifically, if the determination at process management means indicates that the next node can be processed successively by the computer terminal, the user management means preferably sends a request to process the next node to the computer terminal. If the determination indicates that the next node cannot be processed successively by the computer terminal, the user management means preferably sends a list of objects which can be processed to the computer terminal.

In yet another aspect, the present invention may also be understood as a method for workflow management according to a workflow definition consisting of a plurality of nodes and paths connecting the nodes. This method for workflow management includes the steps of: displaying a first process screen to a person in charge executing an activity assigned to a predetermined node; receiving processing based on the first process screen by a person in charge; and if an activity assigned to another node, for the start of which is prerequisite completion of the predetermined node, can be executed consecutively by a person in charge of the predetermined node, displaying a second process screen for processing the other node immediately after the first process screen.

In this method for workflow management, when a person in charge processes a plurality of nodes consecutively, the person is relieved from burdens of having a list of standby nodes displayed that can be processed by the person in charge after completion of a first node, and selecting again a node to be processed.

Displaying a second process screen immediately after a first process screen means that screens directly involved in workflow processing will be displayed consecutively, and that a screen not directly involved in the processing may be displayed between the first process screen and the second process screen. For example, an indication that it is under processing or that it is in the standby condition may be displayed on the screen until the second process screen is displayed.

In addition, the method for workflow management preferably includes a step of displaying a screen showing a list of objects which can be processed by the person in charge, if a node other than the other node is processed by the person in charge after completion of the predetermined node.

The present invention may also be understood as a method for workflow management in a workflow server connected to a plurality of computer terminals over a network. This method for management includes the steps of: receiving from outside a request to terminate processing of a node that is a task of a workflow; referring to the node definition; analyzing a next node for the start of which is prerequisite completion of processing of the node; determining whether a processing person for the node who has completed processing is a person available for processing the next node or not, and if the determination indicates that the person available for processing is the same person as the above-described person, requesting the processing person for the node to process the next node.

The present invention may also be understood as a program for managing a workflow to be executed by a computer. This program is characterized by making a computer execute the procedures of: receiving a request to terminate processing of a node which is a task of the workflow by receiving means; referring to the node definition by reference means; analyzing a next node for the start of which is prerequisite completion of processing of a node by analyzing means; determining whether a processing person of the node that has been completed is a person available for processing the next node or not by determination means; and if determination means determines that the person available for processing is the same person as the processing person, requesting the processing person of the node to process the next node.

PREFERRED EMBODIMENT

The present invention will be described with regard to the embodiments illustrated in accompanying drawings.

First, main terms that will be used in the present embodiment will be listed for illustration below. FIGS. 1(A) and (B) are diagrams of an exemplary project (a process definition) showing a flow of the process for object tasks to be processed, FIG. 1(A) showing an exemplary workflow definition and FIG. 1(B) showing an exemplary data definition referred to in the workflow definition.

Workflow Definition

A definition of a workflow represented as a plurality of nodes (to be described in the following paragraph) and paths connecting the nodes.

For example, as shown in FIG. 1(A), a plurality of nodes are connected by paths indicated by arrows showing a processing order. In this case, an order of task processing in a workflow is indicated as paths.

Node

A unit to deal with a workflow definition. In FIG. 1 (A), a "Node" is shown as a circle.

Specifically, in FIG. 1 (A), an actual processing person and contents to be processed (activities to be described below) are assigned for each node and data input screen to be displayed to a person in charge is also assigned.

Activity

A description of each of actual tasks forming a logical step to be executed in a process, meaning one assigned to each node.

For example, if a person in charge is assigned to a node, an activity corresponds to a content of a task to be executed by the person in charge. Specific examples for this case may include input and output of data performed by a person in charge on a data input screen assigned to a node.

Data Definition

A data definition that can be set and referred to in a process A name of data, a type of data, and whether it is an array or not are defined. Types include character string type and numeric value type.

As specific examples, "String (character string type)" is defined as a User ID and Name in a data definition shown in FIG. 1 (B), while "String [ ]" is defined as Address and "Integer (numeric value type)" as Age In this embodiment, it is assumed that a single data definition is to be referred to at each node, and data exchanges required between processes also follow a path indicated with an arrow. However, a plurality of data definitions may exist, and different data exchanges may be defined by a path.

Data Attribute Definition

An attribute definition limiting a value hold by data, being a part of data definition. Attributes of character string type data may include limits on the number of characters, while attributes of numeric values may include range specification.

Project

A unit combining a workflow definition and a data definition, being different for each project. At an embodied level, this term can be replaced with "process definition". In a workflow system, a project is identified by a definition ID affixed to an object for processing. When a project is determined, a workflow definition and a data definition to be applied to the object for processing are also determined.

For example, there are various types of applications for an application task workflow such as a business trip application and a leave-claiming application, each type corresponding to a project. As processing method varies according to a type of applications, types of applications, i.e., a workflow definition and a data definition specific to each project are defined. While being processed, a project is determined by a definition ID affixed to an object for processing, i.e., a type of application is identified, and an object for processing is processed on the basis of a determined workflow definition and a data definition of a project.

Process

A task unit for a workflow. This is an embodiment of a project, and an individual workflow created from a project. As for a process, a task flows along with a pattern of paths represented by a workflow definition in the original project. And a data set represented by a data definition stores different contents for each process.

For example, although "Leave-Claiming Application for May" and "Leave-Claiming Application for June" are different processes, with having different process ID's, "Leave-Claiming Application for May" and "Leave-Claiming Application for June" correspond to a common project called "Leave-Claiming Application", being processed with a common workflow definition and a common data definition. If there are different process ID's, specific contents of data (for example, date or applicant) will vary even with a common pattern of path. Although this is an example of different processes with a common project, even different processes with different projects may be processed as objects for processing in a workflow system of the present invention.

The embodiment will be described in detail in due order starting with a general configuration of the system.

FIG. 2 is a diagram showing a general configuration of a workflow system to which this embodiment of the invention is applied. A workflow system of the embodiment includes: a computer terminal for designing 10 to design a workflow; a computer terminal for operation of a workflow (information processing terminal) 20 provided to correspond to a person in charge of carrying out a task; and a workflow server (information processor) 30 to store various programs for executing a workflow. The computer terminal for designing 10, the computer terminal for operation 20, and the workflow server 30 are connected to each other to form a network. However, in this embodiment, the computer terminal for designing 10 may be omitted in a workflow system in FIG. 2.

In the workflow server 30, a workflow system is defined to make a workflow processing possible. This definition allows a designer, for example, to design a flow of processes for a task to be processed and a data structure used in a process by means of a workflow designing function of the computer terminal for designing 10 that has a function of executing a task defined in advance (a defining function for providing a task processing in a workflow system) and to register the designed flow and the data structure in the workflow server 30 as a project in a workflow system. On this occasion, a definition ID) that can uniquely identify a project is added to each project to be registered. Each task flow created from projects is a "Process" that is made up of activities, which are the processing for each person in charge.

In defining a workflow system, designing is performed by arranging nodes and connecting paths between the nodes to set the processing order thereof. Attributes for nodes and paths can be provided here. A name of a node and an executing user to be in charge of it may be defined as an attribute of the node. Allocation types of executing users include: direct designation to input a user ID directly, relational designation with an indication of relationship with a processing user of another node (for example, a processing user's superior in predetermined node); job title designation to designate with a job title; role designation to designate with a role; group designation indicated with a group of users belonging to one organization (for example, reception section or accountant's department); and data reference designation designating a processing user by the value of data defined in a data definition as shown in FIG. 1(B). As a path attribute, a condition of making a path effective is defined.

Each person in charge inputs his/her own identification information to connect to a workflow system through the computer terminal for operation 20. An activity for each person in charge is assigned to correspond to a node that is one of a workflow definition shown in FIG. 1(A). A person in charge displays activities assigned to him/her on a display of a computer terminal for operation 20 to execute processing designated by means of an interface such as a keyboard or a mouse. When processing completes, processing of a next activity will be assigned to a person in charge who can process following the paths in a workflow definition. For example, when a network of a workflow system uses Internet etc., a person in charge can perform a processing operation on a web browser made to appear on the computer terminal for operation 20.

FIG. 3 is an illustration showing a general configuration of the workflow server 30. The workflow server 30 of this embodiment includes a project management program 31, a process management program 32, a client request management program 33, and a user management program 34 as management means. The workflow server 30 also includes a workflow definition storage unit 35, a data definition storage unit 36, a process storage unit 37, a workflow status storage unit 38, and a user information storage unit 39 as storage means that may be placed anywhere in a network where a processing of a workflow system is available.

The project management program 31 stores and manages data associated with a workflow definition and a data definition of a project in the workflow definition storage unit 35 and data definition storage unit 36 respectively. Each project is identified by each definition ID. Each of registration of a new definition and modification of an existing definition is managed through the project management program 31 with a definition ID.

The process management program 32 manages a process created by using a project definition. A process has a definition ID and a process ID for identifying each process from a plurality of processes created from a common definition. A process is managed in the process management program 32 with a combination of the definition ID and the process ID. The process storage unit 37 stores an activity in operation, a person in charge executing or to execute an activity, data used in a process. On completion of an activity, a next activity is assigned based on the above-described information. A person in charge of an activity also determines whether a next activity can be processed or not. Further, in each occurrence of events such as creation of a process, allocation of an activity, completion of a process, the process management program 32 writes a status of each event on the workflow status storage unit 38.

The client request management program 33 includes a function of receiving a request from a person in charge who uses the computer terminal for operation 20. The client request management program 33 further includes functions of providing a list of work items (of which a person in charge is a user who can process or an executing user) currently assigned to a person in charge, as well as receiving an activity completion request from a person in charge and in turn sending to the process management program 32 as such. The client request management program 33 still further includes functions of receiving detailed information about a next activity which can be processed sent from a process management program 32, and of requesting a person in charge to process consecutively a next activity. The client request management program 33 identifies and processes a person in charge and an object for processing according to a user ID and a process ID.

The user management program 34 controls a person in charge who can take part in a workflow system. Therefore, user information is registered in the user information storage unit 39, which the user management program 34 accesses as required. Specifically, when a new user wants to connect to the system through the computer terminal for operation 20, an ID and a password input by the user are checked in the user management program 34. Information such as an organization (group) that a user belongs to, hierarchy of an organization, a superior of a user, and classification of user's authority is stored in the user information storage unit 39. Such information is referred to when the process management program 32 extracts data on a person available for processing of a next activity and determines whether a current processing person can process a next activity or not. Information to be referred to varies according to, for example, an attribute of a node within a workflow definition (name of a node, executing user, etc.) as shown in FIG. 1(A).

Operation of the workflow system in this embodiment will now be described. FIG. 4 is an illustration showing an example of a workflow of application processing in accordance with a registered project "definition a". FIG. 5 is a diagram showing an example of a "definition a" registered in advance in the workflow definition storage unit 35 and the data definition storage unit 36 in the workflow server 30. Here, it is assumed that a project "definition a" designed by a designer with the computer terminal for designing 10 has already been registered in the workflow definition storage unit 35 and a data definition storage unit 36 in the workflow server 30.

A project "definition a" shown in FIG. 4 will now be described with an example of a case of application processing workflow of a slip being defined. Specifically, a reception task may be assigned as Node A, an approval task B as Node B, and an approval task C as Node C. The project "definition a" is a definition ID meaning, for example, a type of application processing, specifically a leave-claiming application or a business trip application in such application processing.

Once a slip has been submitted, processing starts in accordance with a workflow of a project "definition a". First, Node A is assigned as an activity to a person who is substituted into data called User ID as a person in charge able to process (Person In Charge A as shown in FIG. 5). When Person In Charge A wants to perform Node A, a list of work items as shown in FIG. 6 is displayed on a screen of the computer terminal for operation 20 of Person In Charge A. In FIG. 6, "No." refers to a process ID given to each slip, and "contents" refers to an activity. When Person In Charge A selects an object for processing of No. a001 (reception of an applied slip), a screen for receiving an applied slip as a reception task shown in FIG. 7 is displayed. Person In Charge A performs required processing on a screen as shown in FIG. 7, selects between approved and rejected, and completes processing of Node A.

When processing of Node A completes, each of Node B and Node C which has been registered as an activity next to Node A in "definition a" as shown in FIG. 5 becomes executable. A screen for Approval Task B as shown in FIG. 8 is displayed to a person in charge who can execute Node B, which will be processed in accordance with "definition a" shown in FIG. 5 in the same manner as Node A. It is processed in the same manner for Node C.

As shown in "definition a" in FIG. 5, a person in charge who can execute Node B is defined to be either Person In Charge A or Person In Charge B. Now, a flow of a workflow system after completion of Node A will be described with reference to FIG. 9, where Person In Charge A is assumed to process as a processing person for each of Node A and Node B, which is an activity of "definition a".

FIG. 9 is a flowchart showing a flow of a consecutive processing from the end of processing of a node to the beginning of processing of a next node that can be processed in the workflow server 30.

First, when the workflow server 30 receives a request to terminate processing of Node A from a person in charge as shown in FIG. 9 (step S201), the server 30 refers to "definition a" including Node A as shown in FIG. 5 (step S202).

Then, to know whether each of Node B and Node C that is included in the referred "definition a", and that is an activity which can be processed immediately after Node A are which can be processed after Node A, the server determines whether a consecutive processing standby time $t_1$ is longer than 0 or not (step S203). If a consecutive processing standby time $t_1$ is longer than 0, analysis of each of Node B and Node C that is an activity which can be processed next is made (step S204). If a consecutive processing standby time $t_1$ is instead 0, process of step S208 to be described below is performed without analysis.

Then a determination whether an analysis of an activity which can be processed after Node A has completed within the consecutive processing standby time $t_1$ or not (step S205) is made. As a consecutive processing standby time $t_1$ for Node A is three seconds as shown in FIG. 5, a determination whether an analysis has completed within three seconds or not is made. If an analysis has not completed within a consecutive processing standby time $t_1$, processing of step S208 to be described below is performed.

If an analysis has completed within a consecutive processing standby time $t_1$ instead in step S205, since contents to be analyzed contain data on a person in charge who can process an activity that can be processed next, a determination whether a processing person of Node A can be a person in charge of Node B and Node C or not is made based on this contents (step S206). As shown in FIG. 5, it is defined that Person In Charge A can process Node B, while Person In Charge C is defined to process Node C. Then, the same processing person as that of Node A is requested to start processing Node B, of which a person in charge is determined to be the same person as a processing person of Node A, as an activity which can be processed next and the flow ends (step S207). Since Person In Charge C is defined to be able to execute Node C, a processing person of Node A is determined to be unable to process in step S206, so that processing of step S208 to be described below will be performed.

In the case where Node B is also processed, a next activity does not exist for Node B as shown in FIG. 5, with a consecutive processing standby time $t_1$ being set to 0. In such a case, a consecutive processing standby time $t_1$ is determined not longer than 0 in the above-described step S203, and then the workflow server 30 extracts activities that can be processed by a processing person and creates a list thereof (step S208). Then, the workflow server 30 sends the list to a computer terminal for operation 20 of a processing person, and requests a processing person to select an activity to be processed (step S209), and the consecutive processing completes. If it is determined "No" in steps S205 and S206, the same processing as in steps S208 and S209 are also performed.

Functions of the workflow server 30 in consecutive processing from the end of Node A to the beginning of Node B will now be described further in detail. FIG. 10 is a specific illustration of processing in the case where Node A and Node B can be processed successively. FIG. 1 is a diagram showing an exemplary state of a process performed in Node A.

When Person In Charge A inputs that he/she will complete processing of Node A into a computer terminal for operation 20, a computer terminal for operation 20 requests a workflow server 30 to terminate processing as shown in FIG. 10. Then the workflow server 30 receives the request to terminate processing from the computer terminal for operation 20, specifically, receiving a definition ID, a User ID of a processing person having operated the computer terminal for operation 20, a process ID of an activity, a type of each activity, and data along with the completion request in the client request management program execution unit 330 as shown in FIG. 11. A type of each activity and data, etc. will be in turn sent from the client request management program execution unit 330 to the process management program execution unit 320 as a request to terminate processing.

Next, the process management program execution unit 320 requests the project management program execution unit 310 to refer to a definition in accordance with a definition ID and types of each activity shown in FIG. 11. In response, the project management program execution unit 310 extracts a requested definition from a "definition a" stored in the workflow definition storage unit 35 as shown in FIG. 5 to return the definition back to the process management program execution unit 320.

The "definition a" sent to the process management program execution unit 320 here includes an activity to be processed next to Node A and a consecutive processing standby time $t_1$ for Node A as shown in FIG. 5. The process management program execution unit 320 sends the consecutive processing standby time $t_1$ to the client request management program execution unit 330, and starts an analysis of an activity to be processed next as well as completion processing of Node A.

The client request management program execution unit 330 that received a consecutive processing standby time $t_1$ enters a standby state without performing any processing during a consecutive processing standby time $t_1$. Then, when termination process of Node A and an analysis of step S204 have been completed by the process management program execution unit 320, the process management program execution unit 320 sends a notification that processing has completed to the client request management program execution unit 330.

As shown in FIG. 10, on receiving a notification that processing has completed within a consecutive processing standby time $t_1$, the client request management program execution unit 330 exits a standby state to request the process management program execution unit 320 for a list of objects to be processed successively. In response, the process management program execution unit 320 sends a list of objects for consecutive processing to the client request management program execution unit 330.

Then the client request management program execution unit 330 sends a request for starting processing of objects for processing to the process management program execution unit 320, which in turn notifies that it has entered a standby state to the client request management program execution unit 330, which means either Person In Charge A or Person In Charge B can be a person in charge who can execute Node B as shown in a "definition a" illustrated in FIG. 5. Therefore, writing the start of Node B processing into a workflow status storage unit 38 by Person In Charge A can prevent Person in Charge B from starting processing of Node B.

In response to entering of the process management program execution unit 320 into a standby state, the client request management program execution unit 330 requests a processing person's computer terminal for operation 20 to process Node B, which is a next activity.

As described above, after completion of Node A, Person In Charge A of Node A can proceed to processing of Node B. Therefore, immediately after the processing of Node A has terminated, a screen for approval task for Node B as shown in FIG. 8 is displayed on a computer terminal for operation 20 of Person In Charge A of Node A, who can proceed to processing of Node B immediately after Node A. Thus, actions including reselecting an object for processing from a list as shown in FIG. 6 displayed after processing of Node A has completed as in conventional technique can be dispensed with, thereby starting of processing Node B by Person In Charge A is simplified and operability is improved.

Another case that Node B, which can be processed next, is cannot be processed will now be described. FIG. 12 is a specific illustration of processing in the case where Node A and Node B cannot be processed successively.

In FIG. 12, processing proceeds in the same way as in FIG. 10 until the process management program execution unit 320 refers to a definition of the project management program execution unit 310 to send a consecutive processing standby time $t_1$ for Node A to the client request management program execution unit 330. In FIG. 11, however, since completion processing (completion processing of Node A and analysis of each activity to be processed) consumes time too much to complete processing within a consecutive processing standby time $t_1$.

Then, the client request management program execution unit 330 recognizes that a notification that processing has completed has not been received within a consecutive processing standby time $t_1$ from the process management program execution unit 320, thereby the client request management program execution unit 330 makes a request to a process management program execution unit 320 for a list of objects for processing. The process management program execution unit 320 in turn sends a list of objects for processing back to the client request management program execution unit 320. Since processing has not been completed by the process management program execution unit 320, it is clearly understood that Node B is not included in activities of a list of objects for processing. The client request management program execution unit 330 sends the received list of objects for processing to a computer terminal for operation 20 of a processing person in parallel with requesting a person in charge to select another object to be processed. Then, a person in charge who is determined not to process Node B consecutively will be free to perform the other tasks. Thus, when the workflow server 30 processes are slow, this embodiment may prevent a person in charge from waiting for an excessively long time by presetting a consecutive processing standby time $t_1$ in a project definition in a workflow system, as well as may prevent efficiency of task processing from decreasing by existence of a process for making a consecutive processing possible.

A consecutive processing standby time $t_1$ is not necessarily provided in this embodiment. For example, if a workflow server 30 is not pressed for time in processing of tasks, or if it is estimated that activities should be processed by only one person as far as the person is able to process them consecutively, a request for processing a next activity may be made to a person in charge whenever a consecutive processing is possible without setting a consecutive processing standby time $t_1$.

A workflow system of this embodiment allows one person in charge to process efficiently a plurality of activities of an object to be processed with a common process ID consecutively without performing complex programming. A person in charge can continue with consecutive processing till a consecutive processing standby time $t_1$ runs out or till his/her virtual process authority expires. Thus, in a workflow system of this embodiment, a person in charge can be changed dynamically for each activity in order to adapt to a situation independently of a project definition; for example a person in charge can be decided in accordance with a workload of each person in charge, so that processing can be performed efficiently.

In particular, a person in charge available for processing may be flexibly defined for each activity such as direct definition, definition by relation, definition by job title, definition by role, definition by group, etc. These definitions may also be modified to adapt to a condition of workflow system processing, workload or the time of day. For example, in the case of definition by role, Mr./Ms. A may be defined to be registered for both role A and role B usually, and only for role B for busy times, so that work can be efficiently distributed in a workflow system.

Even if processing method of a workflow system are subdivided into a plurality of nodes, processing can be dynamically changed for each node from parallel processing by a plurality of persons to consecutive processing by a single person without degrading processing efficiency. Therefore, efficient workflow system can be designed.

In the above-described workflow system of this embodiment, although "available for consecutive processing" is set as an attribute of an activity in definition of a process, such an attribute can be set for a whole of a workflow system or as a project in order to set to determine whether a next node may be processed successively or not for each and every processing of nodes.

In a workflow system in this embodiment, attributes can be dynamically changed as required by means of process design tools etc.

A program executing a workflow described in this embodiment is stored in a storage medium for sale or other purposes, with a medium storing a program for executing the above-described process such as CD-ROM being a typical one. An example is also available in a form of a program being downloaded over a network. In this case, media include a medium used in a transmitter of a program or such a storage medium as hard disk storing a downloaded program. A program having been downloaded in such a storage medium can be read out by using, for example, a CD-ROM driver, which is input means. In addition, interface means (transmission means) that can serve as a program transmitter, and, for example, that can supply a program implementing an embodiment of the present invention in response to a download request from a computer terminal connected to Internet is preferably provided.

Each configuration of the above-described embodiments may also be provided as an option or can be modified within the spirit of the invention as required.

ADVANTAGES OF THE INVENTION

As described above, when one person in charge performs a plurality of processes consecutively, efficient processing is possible according to a workflow system of the present invention.

BRIEF DESCRIPTION OF THE DRAWINGS

FIG. 5 shows an exemplary "definition a" registered in advance with a data definition storage unit 36 in the workflow server 30;

FIG. 11 shows an example of states of a process performed in Node A;

DESCRIPTION OF SYMBOLS

Figure 1A:
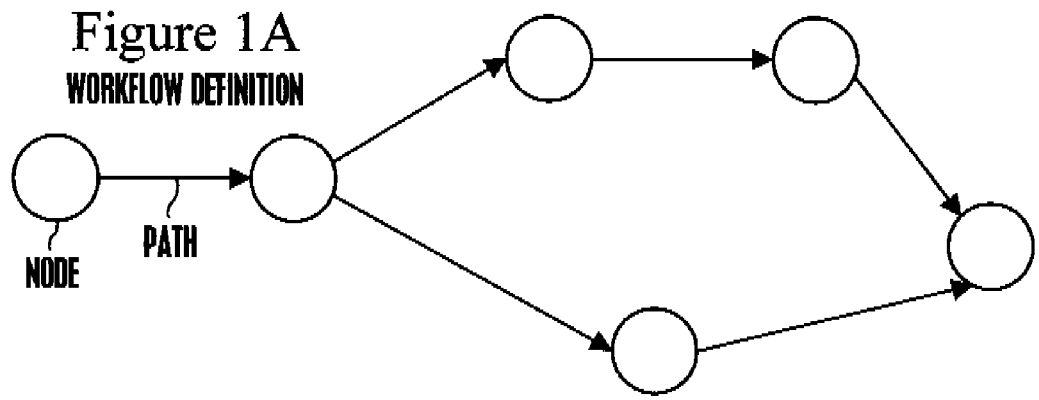
FIGS. 1 (A) and 1 (B) are diagrams of projects (process definition) showing a flow of processing in task objects.
Figure 1B:
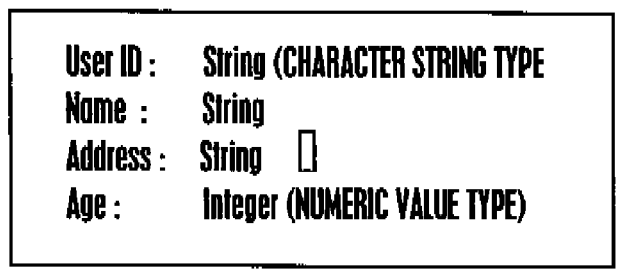
Figure 2:
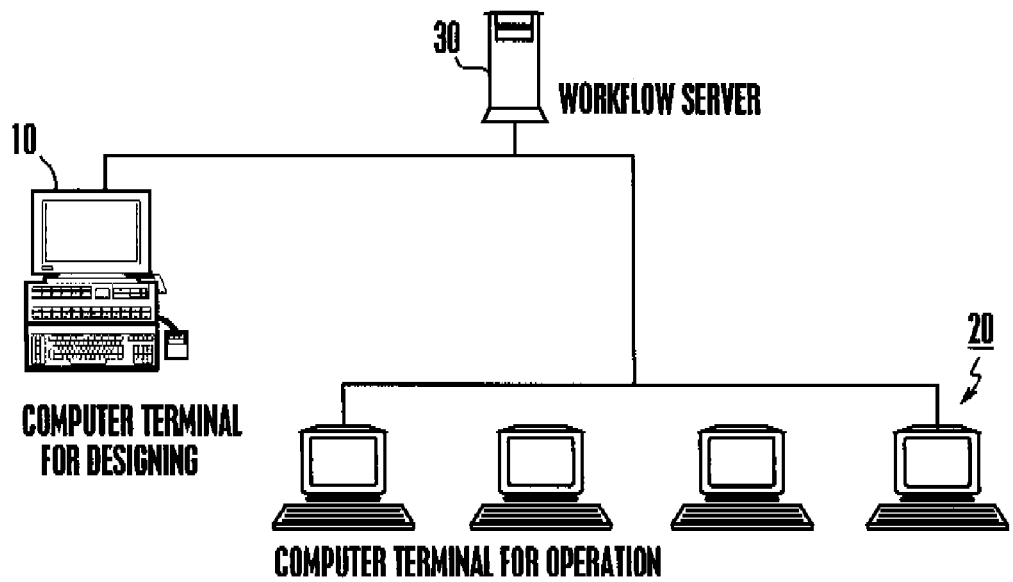
FIG. 2 shows a general configuration of a workflow system to which an embodiment of the present invention is applied.
Figure 3:
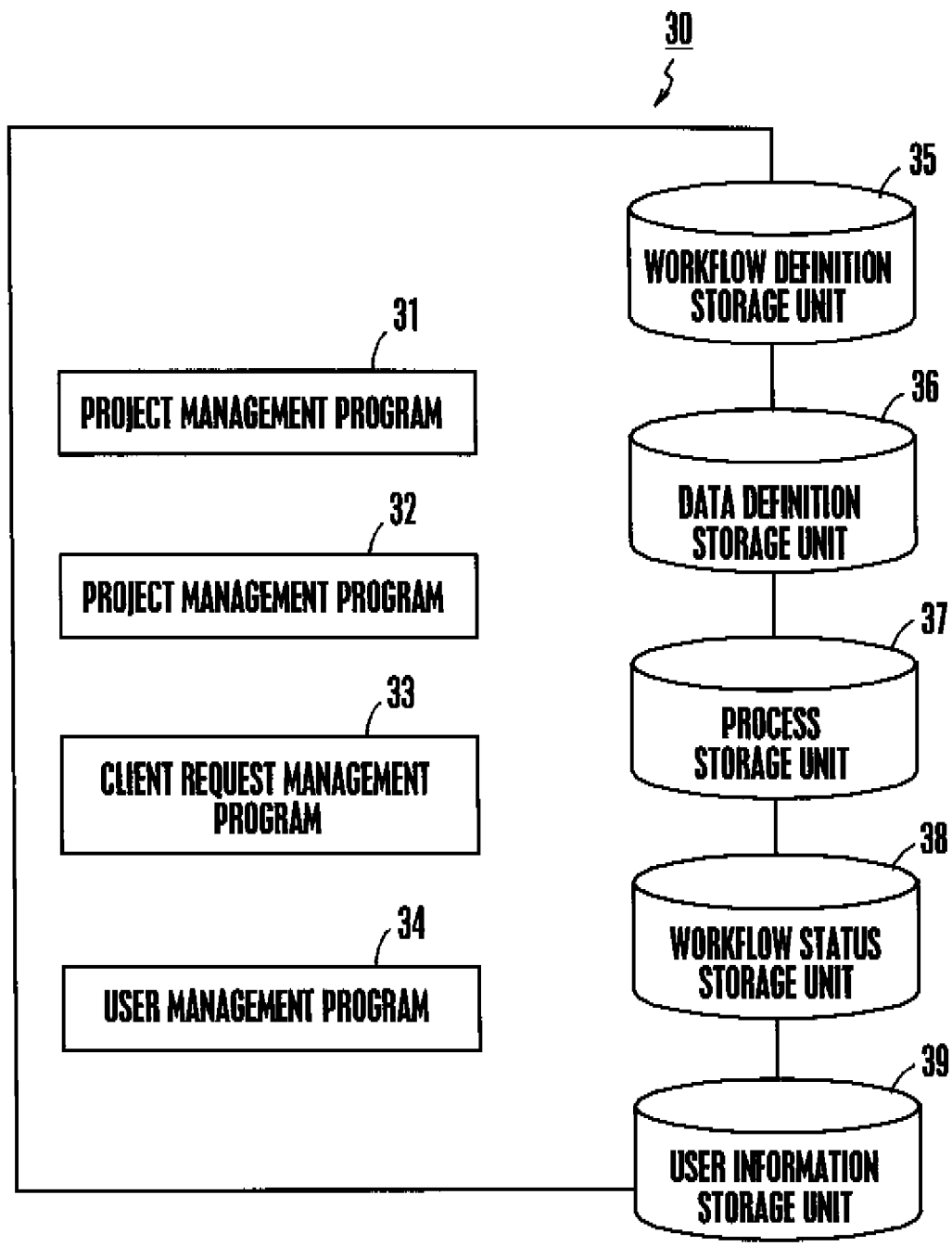
FIG. 3 shows a general configuration of a workflow server 30.
Figure 4:
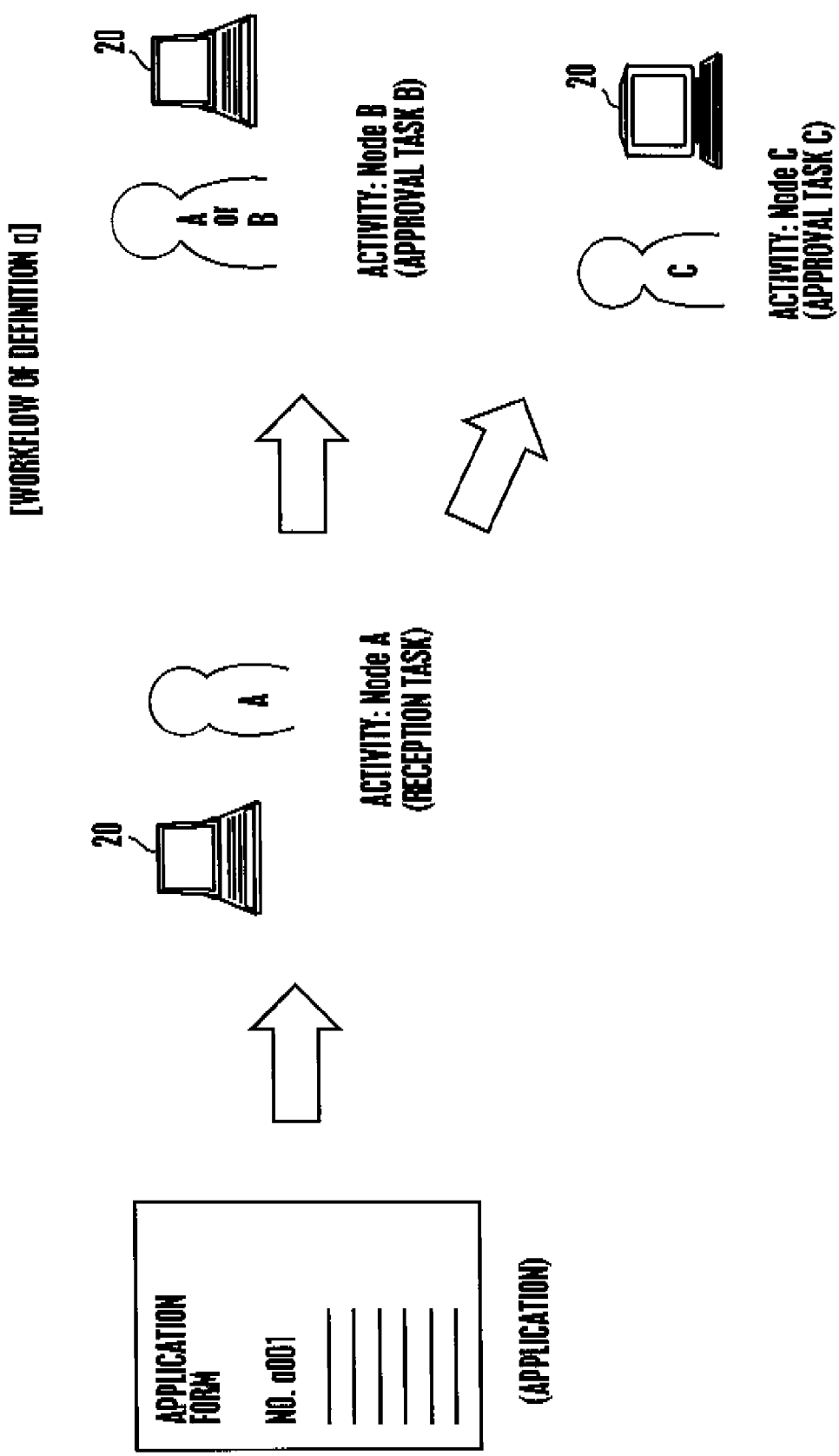
FIG. 4 illustrates an exemplary workflow of application processing in accordance with a registered project "definition a"
Figures 6, 7, 8:
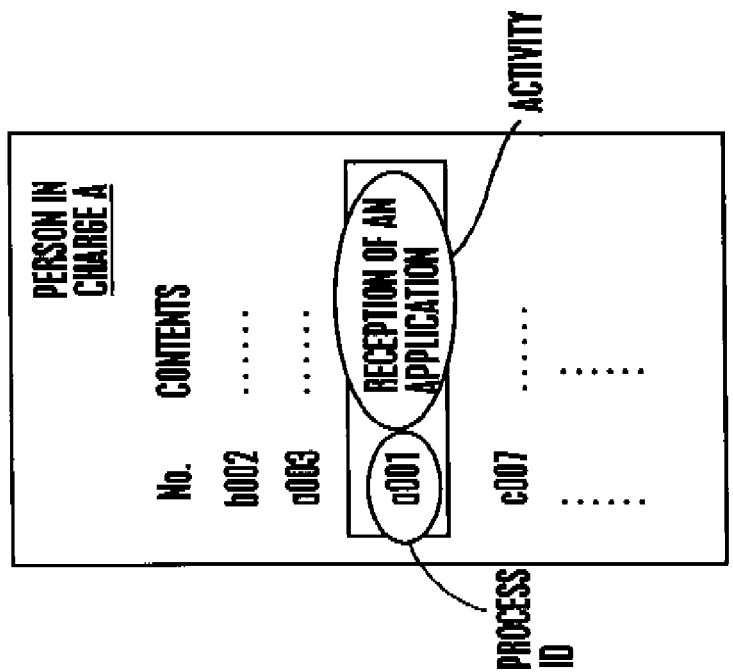
FIG. 6 is a screen showing a list of work items displayed to a person in charge.
FIG. 7 is a screen for Reception Task displayed to a person in charge.
FIG. 8 is a screen for Approval Task B displayed to a person in charge.
Figure 9:
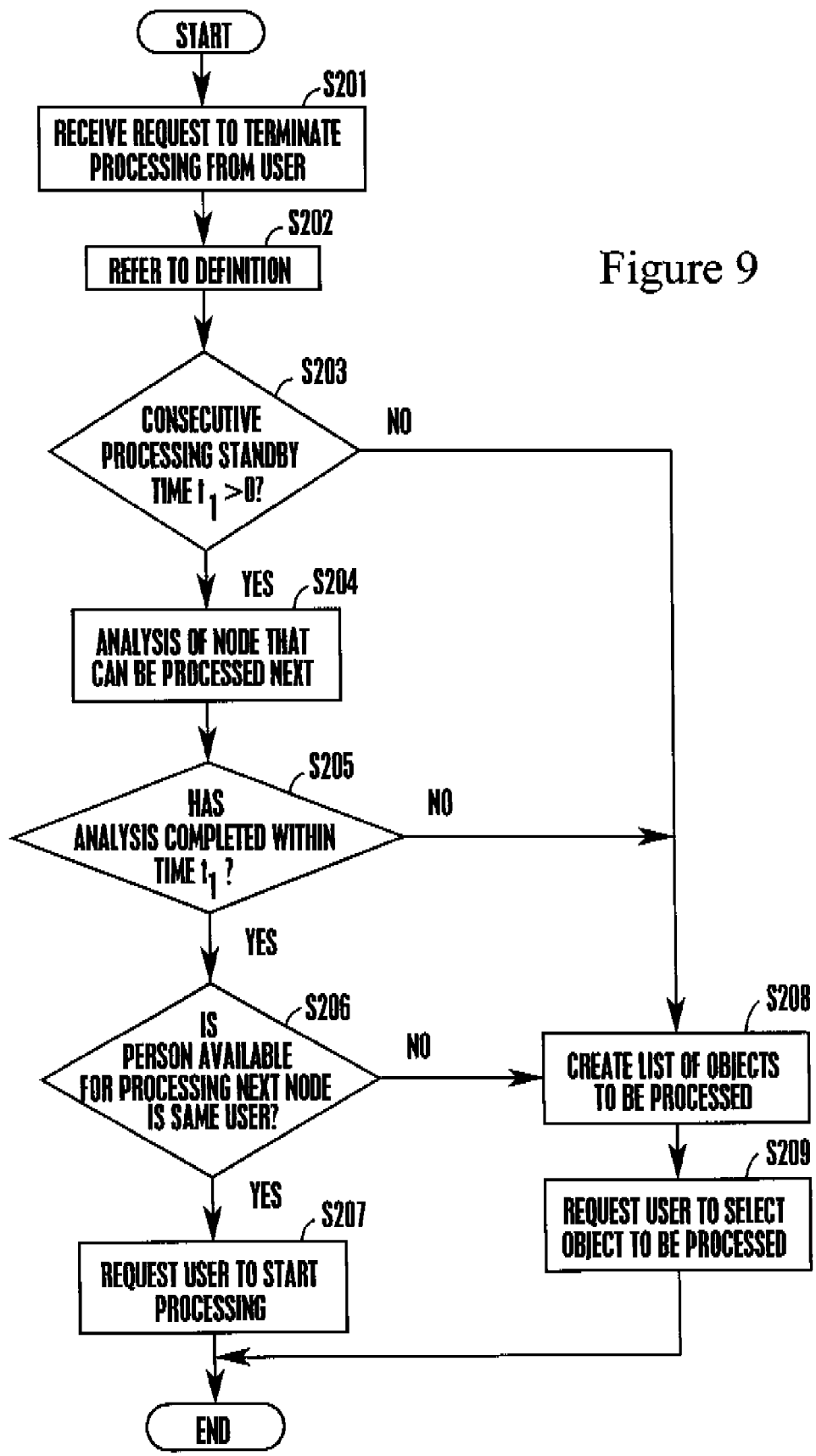
FIG. 9 is a flowchart showing a flow of a consecutive processing from the end of processing of a node to the beginning of processing of a next node that can be processed.
Figure 10:
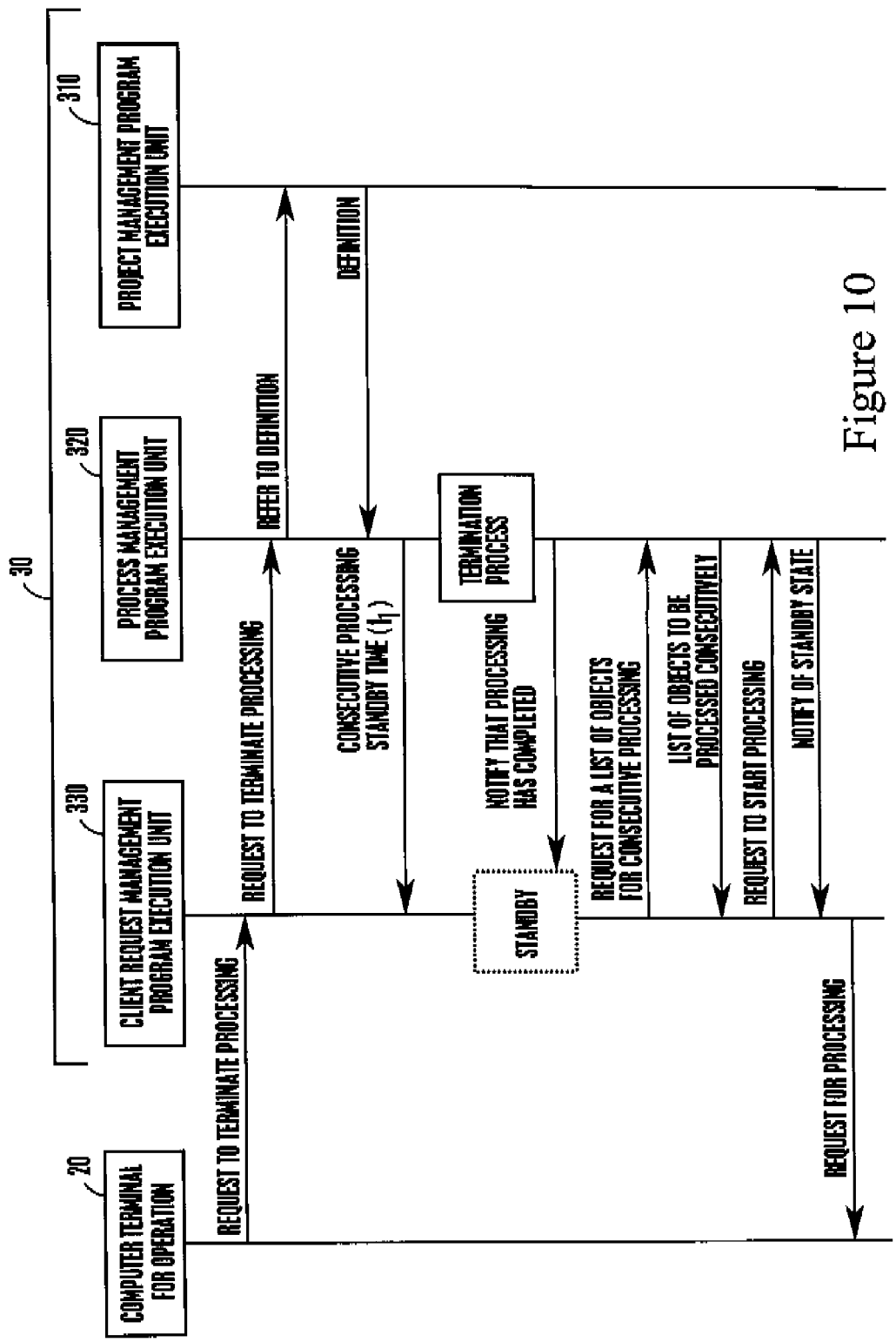
FIG. 10 specifically illustrates processing when Node A and Node B can be processed successively.
Figure 12:
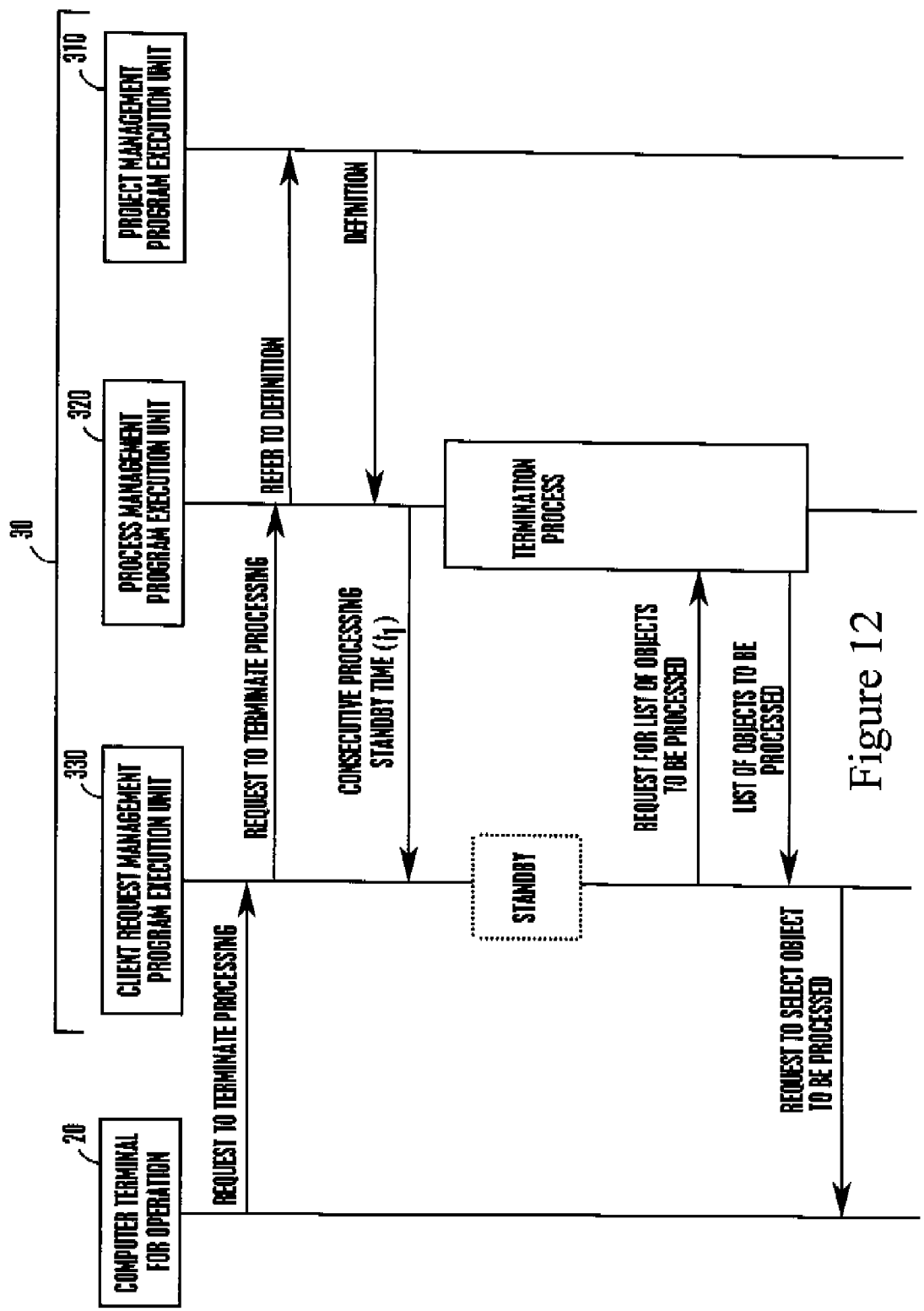
FIG. 12 specifically illustrates processing when Node A and Node B cannot be processed successively.
Figure 13:
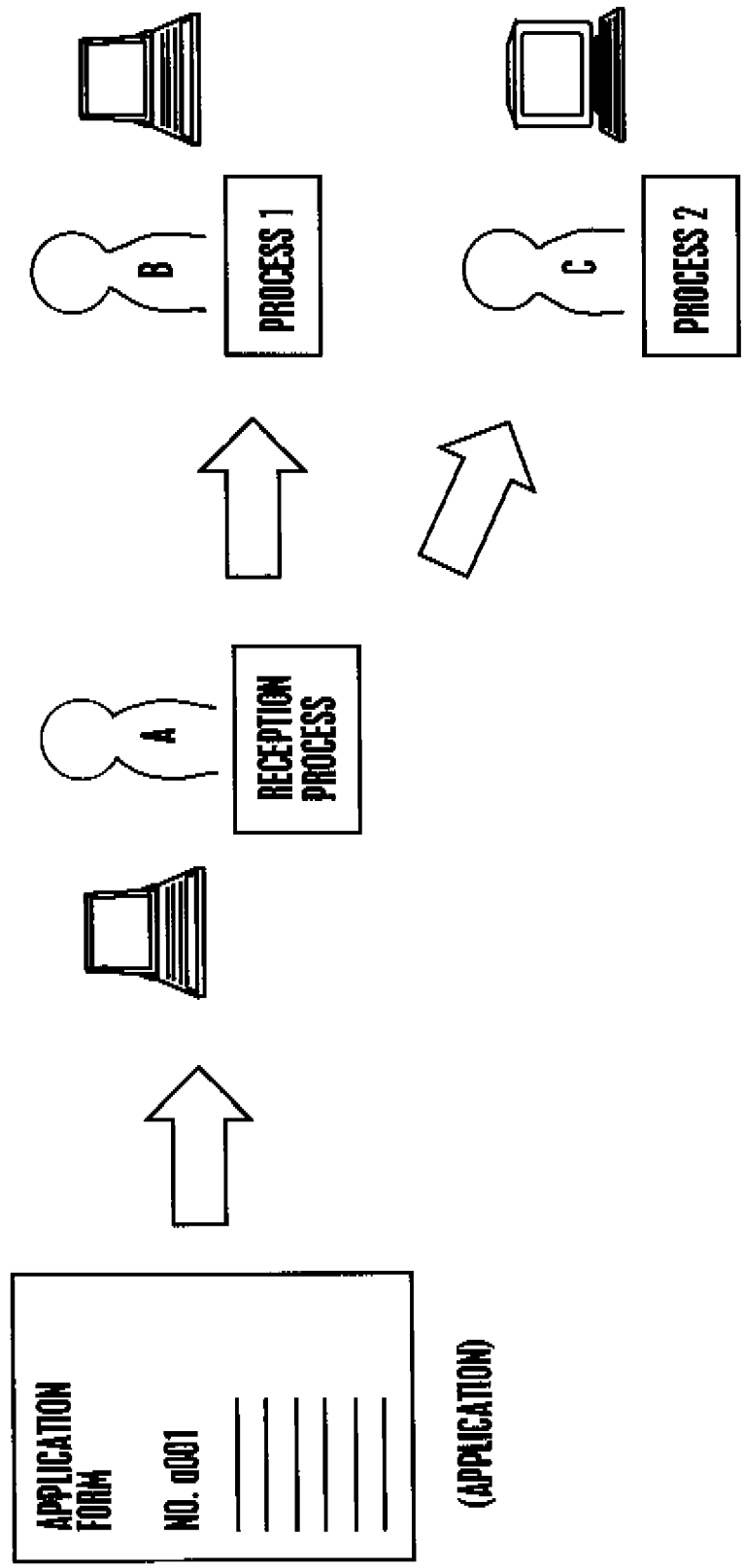
FIG. 13 illustrates a flow of application processing.
Figure 14:
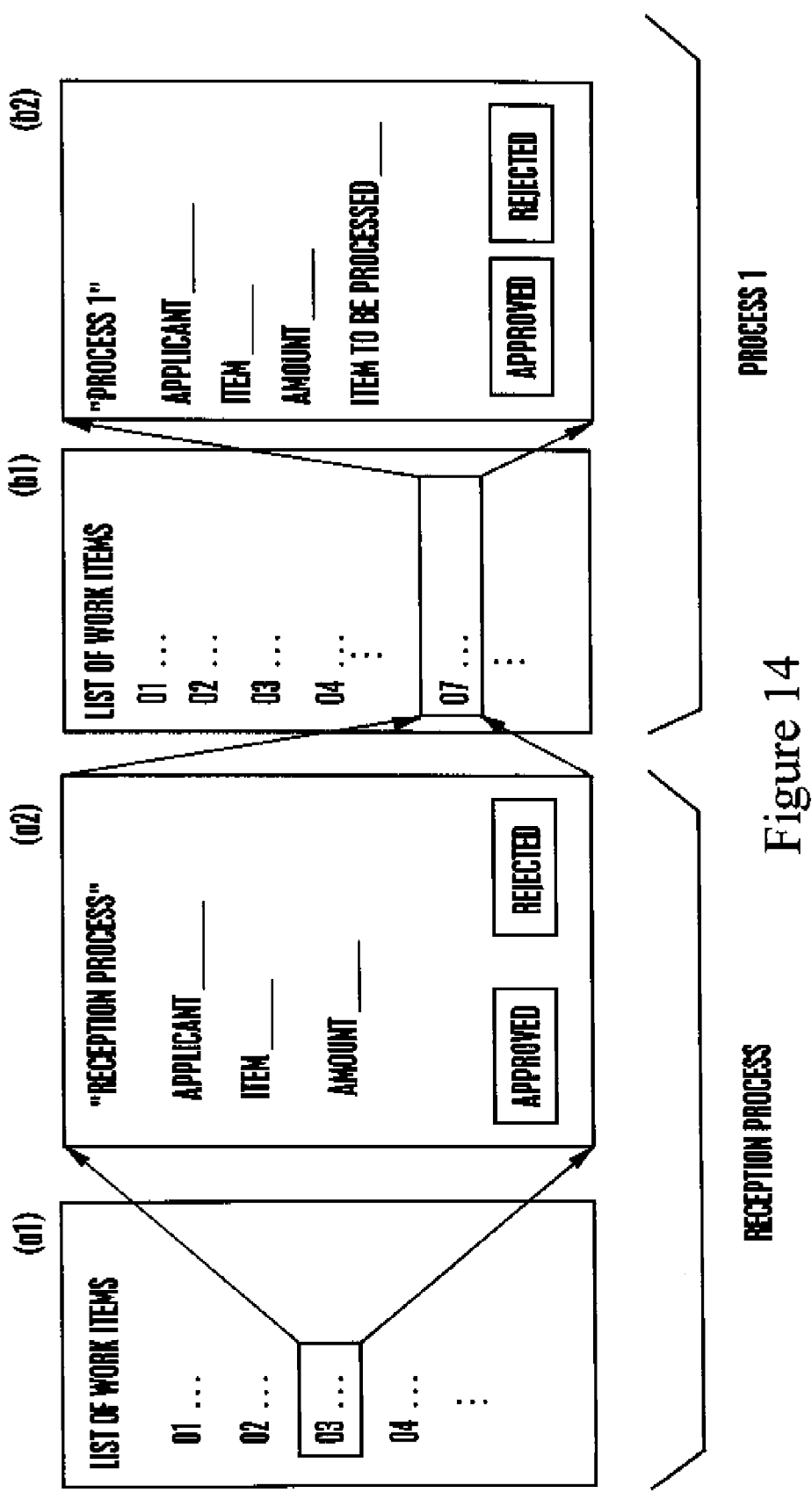
FIG. 14 illustrates a conventional screen on a processing person's computer in an application processing shown in FIG. 13.

10 . . . . Computer terminal for designing
20 . . . . Computer terminal for operation (Information processing terminal)
30 . . . . Workflow server (Information processor)
31 . . . Project management program
32 . . . Process management program
33 . . . . Client request management program
34 . . . User management program
35 . . . Workflow definition storage unit
36 . . . Data definition storage unit
37 . . . . Process storage unit
38 . . . . Workflow status storage unit
39 . . . . User information storage unit
310 . . . . Project management program execution unit
320 . . . . Process management program execution unit
330 . . . . Client request management program execution unit

What is claimed is:

1. A workflow system comprising:
a workflow server for managing a workflow using a workflow definition consisting of a plurality of nodes and a path connecting the nodes; and
a computer terminal, connected to said server over a network, said computer terminal for operation to execute an activity assigned to the nodes, wherein said computer terminal for operation sends a request to said workflow server in response to completion of an activity, said request being for terminate processing for a node corresponding to said activity,
if said node being requested to terminate processing and said next node defined in said workflow definition is capable of being processed by one person in charge, said workflow server makes a request to process the next node to said computer terminal for operation of the one person in charge.

2. The workflow system according to claim 1, wherein said workflow definition defines a group of users as the persons in charge who can process said node.

3. The workflow system according to claim 1, wherein after receiving said request to terminate processing, if said workflow server is ready to make said one person in charge start processing said next node in a predetermined consecutive processing standby time, said workflow server makes a request to process said next node.

4. The workflow system according to claim 1, wherein a computer terminal for designing a workflow definition and sending the workflow definition to said workflow server is connected to said workflow server over the network.

5. A method for workflow management in a workflow server connected to a plurality of computer terminals over a network, comprising the steps of:
receiving from outside a request to terminate processing of a node that is a task of said workflow;
referring to a node definition;
analyzing a next node for the start of which is defined to be prerequisite completion of processing of said node;
determining whether a processing person for said node who has completed processing is a person predefined as being capable of processing said next node; and
if said determination indicates that said person capable of processing is the same person as said processing person, requesting said person for processing said node to process said next node.

6. The method for workflow management according to claim 5, comprising a step of displaying to said processing person an object which can be processed by said person for processing instead of comprising said step of requesting to process if the analysis has not completed in the maximum time for analysis predetermined in a definition for a node in said step of analyzing.

7. A computer product, in a non-transitory computer readable medium bearing a program for managing a workflow to be executed in a computer system, comprising:
instructions for receiving a request to terminate processing of a node which is a task of said workflow;
instructions for referring to said node definition;
instructions for analyzing a next node, for the start of which is defined to be prerequisite completion of processing of said node;
instructions for determining whether a processing person of said node that has been completed is a person predefined to be capable of processing said next node; and
instructions for requesting said processing person of said node to process said next node if said determination means determines that said person capable of processing is the same person as said processing person.

* * * * *